United States Patent [19]
Fischer

[11] 3,902,518
[45] Sept. 2, 1975

[54] ANTI-SYPHON TOILET RESERVOIR VALVE

[76] Inventor: Edward J. Fischer, 630 Queen City Ave., Crescent Springs, Ky. 41011

[22] Filed: Sept. 24, 1973

[21] Appl. No.: 400,052

[52] U.S. Cl. ............ 137/215; 137/533.21; 251/284
[51] Int. Cl. ............................................. F16k 21/18
[58] Field of Search .......... 137/215, 533.11, 533.17, 137/533.21, 533.31, 533.29, 533.19, 533.23, 137/533.25, 533.27, DIG. 5, 216, 216.1, 216.2, 137/217, 218; 251/34, DIG. 1, 12, 284

[56] References Cited
UNITED STATES PATENTS

| | | | |
|---|---|---|---|
| 452,818 | 5/1891 | Weinshank | 137/533.31 |
| 664,898 | 1/1901 | Safford | 137/533.23 X |
| 758,377 | 4/1904 | Miller | 137/533.25 X |
| 1,493,410 | 5/1924 | Wolcott | 137/533 |
| 3,332,433 | 7/1967 | Edmondson | 137/215 |

Primary Examiner—Martin P. Schwadron
Assistant Examiner—Robert J. Miller
Attorney, Agent, or Firm—James W. Pearce; Roy F. Schaeperklaus

[57] ABSTRACT

A toilet reservoir valve assembly incorporating a mounting fixture rigidly fixed in the bottom panel of a toilet reservoir tank. A water supply pipe is compressively attached by a threaded nut to the bottom of the mounting fixture. An anti-syphon valve assembly is rigidly fixed to the top of the supply pipe and extends into the bottom of the mounting fixture. The valve assembly incorporates a mechanically free valve. The valve opens by positive water pressure in the supply pipe and simultaneously throttles the flow of water since the valve moves vertically inside a concentric tube that constitutes an upper extension of the anti-syphon valve assembly. The valve closes against an annular seat by zero or negative pressure in the supply pipe, thus preventing tank water from syphoning into the supply pipe.

6 Claims, 5 Drawing Figures

PATENTED SEP 2 1975 3,902,518
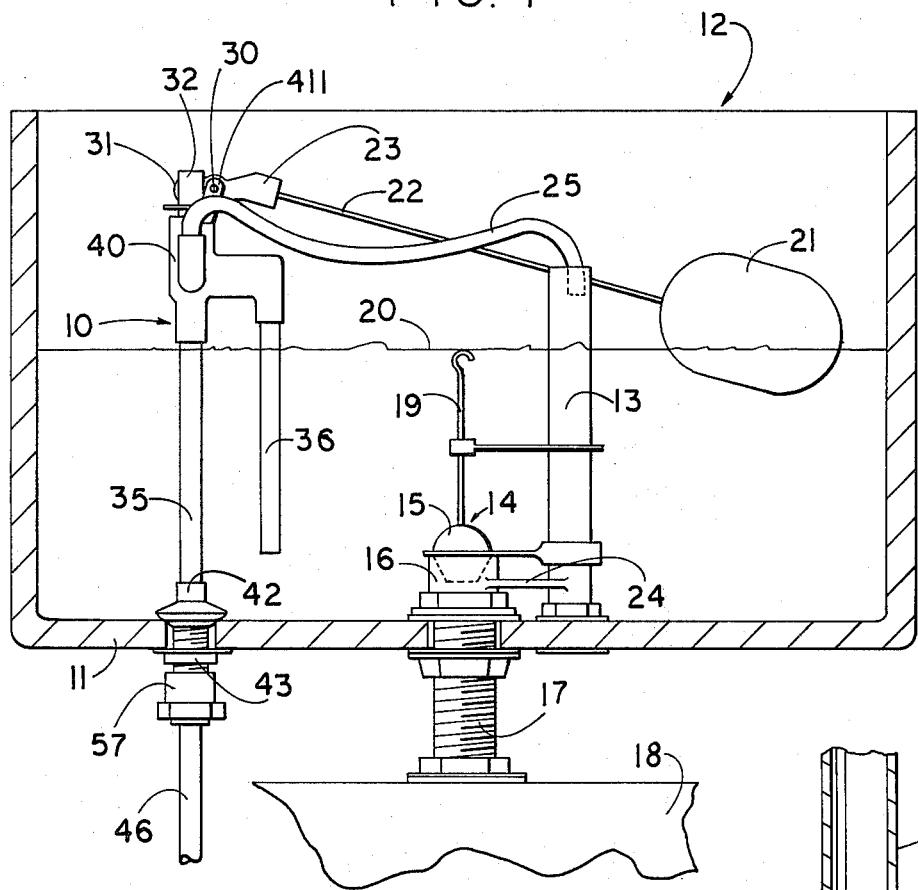

ANTI-SYPHON TOILET RESERVOIR VALVE

This invention relates to toilet reservoir valves. More specifically, it relates to toilet reservoir valves with anti-syphoning means.

An object of this invention is to provide a toilet reservoir valve assembly with an anti-syphoning valve mounted in its base, for the prevention of reverse flow from a toilet tank back into the supply pipe.

Briefly, this invention provides for a toilet reservoir valve assembly incorporating an anti-syphoning valve in the base thereof. In normal operation, water under pressure from a supply pipe flows into a mechanically free, pressure actuated valve incorporated into the toilet reservoir valve mounting fixture. The mechanically free valve is restrained in vertical displacement by a horizontal pin mounted in a cylindrical holder, the holder being in close concentric relationship with the anti-syphoning valve. Water flows up through and over the valve seat and around the mechanically free valve, which being in close spaced relationship with the cylindrical holder, throttles or meters the flow of water into a vertical supply pipe. The mechanically free valve can be held in vertical alignment with its seat by means of a valve stem which is an integral part of the valve and which extends through a hole in the center of the seat. The hole can be round while the valve stem can be triangular in cross section to permit flow therearound.

In abnormal operation, when the pressure in the supply pipe falls below zero, the suction in the supply pipe and the weight of the water in the supply pipe above the valve closes the anti-syphon valve against its seat and prevents reverse flow in the supply pipe.

The above and other objects and features of the invention will be apparent to those skilled in the art to which this invention pertains from the following detailed description and the drawings in which:

FIG. 1 is a view in upright section of a toilet reservoir tank showing an anti-syphoning toilet reservoir valve assembly constructed in accordance with an embodiment of the invention and in spaced relation with the other common parts necessary to complete a reservoir system;

FIG. 2 is a view in upright section of the anti-syphoning toilet reservoir valve assembly illustrated in FIG. 1 in closed or non-flowing position;

FIG. 3 is a sectional view taken along line 3—3 in FIG. 2 showing in bottom elevation the shape of a stem of the anti-syphoning valve;

FIG. 4 is a fragmentary view in upright section of an anti-syphoning reservoir valve assembly constructed in accordance with another embodiment of this invention; and FIG. 5 is a view in section taken on the line 5—5 in FIG. 4.

In the following detailed description and the drawings, like reference characters indicate like parts.

FIG. 1 shows a toilet reservoir valve assembly 10 constructed in accordance with an embodiment of this invention. The valve assembly 10 is mounted in a bottom panel 11 of a toilet reservoir tank 12 and is shown in spaced relation with a vertical overflow pipe 13 and a flush valve assembly 14. A flush valve 15 of the flush valve assembly 14 works against a valve seat 16 which communicates through a bowl filler pipe 17 to a toilet bowl assembly 18. The flush valve 15 is raised by a flush valve rod 19 which is connected to a usual flush handle assembly (not shown).

As the flush valve 15 is raised, water from the reservoir 12 flows over the valve seat 16 and down through the bowl filler pipe 17 and into the toilet bowl 18. As a water level 20 in the reservoir 12 descends, a float bulb 21 also descends. The float bulb 21 is connected by a rod 22 to a main valve actuating lever 23 of the valve assembly 10. The descending float bulb 21 rotates the lever arm 23 clockwise as shown in FIG. 1 by means of the rod 22, thereby releasing a main valve member of toilet reservoir valve assembly 10 to permit refilling of the tank 12. Should the water level 20 in the tank 12 exceed its normal full level, excess water will enter the vertical overflow pipe 13, pass through an overflow pipe extension 24 and into the bowl filler pipe 17 below the flush valve 15. This prevents any overflow of the tank 12. The toilet reservoir valve 10 is equipped with a bowl filler tube 25 which communicates with the overflow pipe 13.

When the float bulb 21 rotates the rod 22 and the main valve actuating lever 23 counterclockwise as shown in FIG. 2 about a pivot pin 30, a head 31 of the lever 23 ascends in contact with a harness 32, to permit opening of a main valve (not shown in detail) mounted inside a housing 40, which can be of usual construction. The housing 40 receives water from a vertical filler pipe 35, and water is discharged therefrom through a tank filler tube 36, which discharges below the normal level of water in the tank 12.

The vertical filler pipe 35 is rigidly fixed into a hollow mounting fixture 42 that is secured into the bottom panel 11 of the tank 12 by a nut 43. A conical rubber seal 44 prevents water from leaving the tank 12 incorrectly.

An anti-syphoning valve assembly 45 is mounted on the top of a supply pipe 46 by means of an annular valve seat holder 47, which can be soldered to the supply pipe 46. The valve seat holder 47 is fitted on its inside diameter with a gasket 48 of resilient composition. The gasket 48 rests on an inwardly directed annular flange 481 of the valve seat holder 47. An anti-syphoning valve 49 has a head 491 which can engage the gasket 48 and is held in vertical alignment by a valve stem 50, which extends through a hole 51 in the gasket 48. The valve stem 50 has a triangular cross section as can be seen in FIG. 3. Under normal operation the triangular valve stem 50 permits water to flow around it and through the hole 51, past the gasket 48 and around the head of the valve 49, which also meters the flow into the vertical pipe 35. The valve 49 and its stem 50 are restrained in upward movement by a pin 52 frictionally held in holes 53 in a retainer tube 54. The tube 54 is provided with two water exit holes 55 for the purpose of filling a cavity 56 in the mounting fixture 42 surrounding the tube 54 silencing the movement of water into the pipe 35. The tube 54 is threaded in the valve seat holder 47 and engages the gasket 48 to hold the gasket 48 on the flange 481. The enlarged head 491 of the valve 49 is guided by the tube 54 as the valve 49 moves up and down. Under abnormal operation, that is, with the loss of water pressure in the supply pipe 46, the head 491 of the valve 49 is pressed against the gasket 48 by the weight of the water in the pipe 35. This prevents the water from syphoning out of the tank 12, which would otherwise contaminate the water in the supply pipe 46.

The anti-syphoning valve assembly 45 is coupled to the mounting fixture 42 by a union nut 57. The nut 57 is provided with an inside diameter flange 58 which engages an outwardly extending annular flange 59 on the valve seat member 47. The flange 59 compresses an O-ring gasket 60 against the bottom end of the mounting fixture 42. This provides a water seal for the only connection to be made at installation.

An alternate embodiment of this invention is shown in FIGS. 4 and 5. An upper end of a supply pipe 146 (FIG. 4) is formed into an outwardly extending flange 70. Frictionally mounted in the upper end poation of the supply pipe 146 and adjacent to the flange 70, is a deformable annular gasket 71. An anti-syphoning valve assembly 72 is provided with a valve seat holder 73. The valve seat holder 73 includes an inwardly directed annular flange 731 on which is mounted an annular gasket 74. An anti-syphoning valve 75 having a lower end portion 751 provided with a conical lower face forceably rests upon the gasket 74 to close a central opening 752 thereof if pressure in the supply line 146 is lost. The lower end portion 751 is sufficiently long that a portion of the lower end portion is retained inside the opening 752 when the valve 75 is fully raised. Under normal operation, the valve 75 rises away from the gasket 74 when water enters from the supply line 146. The water passes around the valve 75 into a mounting fixture 142. The valve 75 is restrained in vertical movement by a pin 77, frictionally mounted in holes 78 of a tube 79. The tube 79 is threaded into the valve seat holder 73 and retains the gasket 74 on the flange 731. The tube 79 guides the valve 75 as the valve moves up and down. A body portion 791 of the valve 75 is provided with flat upright faces 792, as shown in FIG. 5, permitting water to pass the valve 75 inside the tube 79. The supply pipe 146 with gasket 71, the anti-syphoning valve assembly 72, and the mounting fixture 142 are held in assembly by a compression or union nut 157. A seal 160 is provided between the mounting fixture 42 and the valve seat holder 73. Other features of the embodiment shown in FIGS. 4 and 5 can be similar to the features of the first embodiment already described.

The toilet reservoir valve assembly constructions illustrated in the drawings and described above are subject to structural modification without departing from the spirit and scope of the appended claims.

Having described my invention, what I claim as new and desire to secure by letters patent is:

1. In combination with a supply line for a toilet tank, a hollow mounting fixture, means for mounting the mounting fixture in an opening in the bottom of the tank with a lower end of the mounting fixture extending downwardly thereof, means for attaching an upper end of a water supply line to the lower end of the mounting fixture, an annular valve seat holder mounted inside the mounting fixture receiving water from the water supply line, an annular inwardly directed valve seat mounted on the valve seat holder, an annular gasket mounted on the valve seat, a valve member overlying the gasket and engageable therewith when there is a negative pressure in the water supply line to close the opening of the gasket, a tubular guide attached to and extending upwardly from the valve seat holder for aligning the valve member with the gasket and a transverse stop pin mounted in the tubular guide above and engageable by the valve member for limiting upward movement of the valve member, there being a space between the valve member and the interior of the tubular guide to permit water to pass upwardly between the valve member and the interior of the tubular guide when the valve member is released from the gasket to be discharged through an upper end portion of the tubular guide.

2. A combination as in claim 1 wherein the means for aligning the valve member with the gasket includes a stem on the valve member extending through the opening of the gasket, the opening of the gasket being circular, the stem being non-circular so that there is a water passageway between the stem and the gasket when the valve member is raised.

3. A combination as in claim 1 wherein the means for aligning the valve member with the gasket includes a tube mounted on the valve seal member and extending upwardly therefrom surrounding the valve member and the valve member includes a body which is non-complementary with the tube to form a water passageway therebetween, there being portions of the body engageable with the tube to hold the valve member in alignment with the tube.

4. A combination as in claim 3 wherein a lower end portion of the valve member is of inverted conic shape, the conic lower end portion being the portion of the valve member engageable with the gasket.

5. In combination with a toilet reservoir tank, a toilet reservoir mounting fixture, said fixture having a lower tubular portion extending through the bottom of the tank, said tubular portion threaded on the outside diameter to receive a mounting nut, a lower supply pipe with its upper end expanded to a larger diameter and flanged to accept a resilient seal of equal diameter and similar shape, said seal having a central hole, an annular valve seat holder mounted on said resilient seat, a union nut mounted on the lower portion of the mounting fixture and engaging the flange portion of the supply pipe, there being a seal ring between the lower portion and the valve seat holder to form a seal therebetween, an upwardly facing seat on the valve seat holder surrounding the central opening therein, an inner annular seal mounted in the upwardly facing seal, a tubular extension threaded into the upper portion of the valve seat holder, an anti-syphon valve held in loose vertical alignment inside the tubular extension, said extension compressively holding the inner seal in place, and a horizontal pin frictionally held in a pair of horizontal holes in the upper tubular extension to restrain the upward movement of the anti-syphon valve, there being a space between the valve and the interior of the tubular extension to permit water to pass upwardly between the valve and the interior of the tubular extension to be discharged through an upper end portion of the tubular extension.

6. A combination as in claim 1 wherein a tubular guide extends upwardly from the gasket coaxially therewith, an upper portion of the valve member is engageable with the tubular guide, and a lower portion of the valve is retained inside the annular gasket when the valve is at the limit of its upward movement.

* * * * *